United States Patent
Velusamy et al.

(10) Patent No.: US 12,353,516 B2
(45) Date of Patent: Jul. 8, 2025

(54) CLASS PREDICTION BASED ON CLASS ACCURACY OF MULTIPLE MODELS

(71) Applicant: INTERNATIONAL BUSINESS MACHINES CORPORATION, Armonk, NY (US)

(72) Inventors: Suvedhahari Velusamy, Coimbatore (IN); Sathya Santhar, Ramapuram (IN); Kothagorla Lakshmana Rao, Chirala (IN); Sridevi Kannan, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 903 days.

(21) Appl. No.: 17/529,316

(22) Filed: Nov. 18, 2021

(65) Prior Publication Data
US 2023/0153395 A1 May 18, 2023

(51) Int. Cl.
*G06F 18/28* (2023.01)
*G06F 18/20* (2023.01)
(Continued)

(52) U.S. Cl.
CPC .......... *G06F 18/285* (2023.01); *G06F 18/217* (2023.01); *G06N 20/20* (2019.01)

(58) Field of Classification Search
CPC ...... G06F 18/285; G06F 18/217; G06F 40/30; G06F 40/20; G06F 18/214; G06N 20/00;
(Continued)

(56) References Cited

U.S. PATENT DOCUMENTS 7,020,593 B2  3/2006  Hong et al.
10,095,716 B1 * 10/2018  Juneja ................ G06F 40/242
(Continued)

FOREIGN PATENT DOCUMENTS

CA    2921672 C  *  3/2019  ............. G06F 18/24
CA    3133404 A1 *  4/2022  ............. G06N 5/022
(Continued)

OTHER PUBLICATIONS https://learncuriously.wordpress.com/2018/10/21/confused-by-the-confusion-matrix/ (Year: 2018).*
(Continued)

*Primary Examiner* — Steven P Sax
(74) *Attorney, Agent, or Firm* — Harrity & Harrity, LLP

(57) ABSTRACT

A method, computer program product, and computer system for predicting a class of a given input to multiple models. Class parameters of the models are received. A process that predicts the class of a given input to the models is performed using the class parameters of the models. The process is (i) a model ensemble process predicting that the class of the given input is a class that maximizes a function of class accuracy parameters selected from combinations of the class parameters, (ii) a first threshold process based on a requirement that the class of the given input be predicted by running a model whose class accuracy parameter is at least a specified threshold, or (iii) a second threshold process based on a requirement that a specified class be predicted by a running of all models whose class accuracy parameter is at least the specified threshold.

17 Claims, 8 Drawing Sheets

(51) Int. Cl.
*G06F 18/21* (2023.01)
*G06N 20/20* (2019.01)

(58) Field of Classification Search
CPC ........ G06N 20/20; G06N 5/04; G06N 99/005; H04M 3/5191; H04M 3/5233; H04M 3/5238; H04M 3/5235; G06V 30/40
See application file for complete search history.

(56) References Cited

U.S. PATENT DOCUMENTS

| | | | |
|---|---|---|---|
| 11,169,788 B2* | 11/2021 | Bequet | G06N 3/044 |
| 11,323,570 B1* | 5/2022 | Lamba | G06F 40/30 |
| 11,449,790 B2* | 9/2022 | Hong | G06N 3/047 |
| 11,450,225 B1* | 9/2022 | Kilari | G06F 40/30 |
| 11,514,504 B2* | 11/2022 | Phillips | G06Q 30/0261 |
| 11,961,611 B2* | 4/2024 | Zheng | G06F 40/174 |
| 12,229,642 B2* | 2/2025 | Dirac | G06N 20/00 |
| 2014/0136452 A1* | 5/2014 | Wellman | G06N 20/00 706/12 |
| 2016/0078361 A1* | 3/2016 | Brueckner | H04L 67/10 706/12 |
| 2017/0330109 A1* | 11/2017 | Maughan | G06N 5/04 |
| 2017/0357879 A1* | 12/2017 | Odaibo | G06N 20/00 |
| 2017/0372232 A1* | 12/2017 | Maughan | G06F 3/0482 |
| 2019/0043193 A1* | 2/2019 | Odaibo | G06F 18/285 |
| 2019/0325259 A1* | 10/2019 | Murphy | G06F 18/2148 |
| 2019/0347424 A1* | 11/2019 | Bezzi | G06F 21/577 |
| 2020/0065384 A1* | 2/2020 | Costello | G06N 3/04 |
| 2020/0120121 A1* | 4/2020 | Aggarwal | H04W 88/16 |
| 2021/0073686 A1 | 3/2021 | Ding | |
| 2021/0117869 A1 | 4/2021 | Plumbley | |
| 2021/0224594 A1* | 7/2021 | Odaibo | A61B 3/14 |
| 2022/0366301 A1* | 11/2022 | Rakhmanberdieva | G06N 3/08 |
| 2023/0368915 A1* | 11/2023 | Abraham | G01N 33/574 |

FOREIGN PATENT DOCUMENTS

| | | | | | |
|---|---|---|---|---|---|
| CA | 3133429 | A1 | * | 4/2022 | G06N 5/04 |
| CN | 109886465 | A | * | 6/2019 | |
| CN | 109886465 | B | * | 3/2022 | |
| CN | 109960800 | B | * | 6/2023 | G06F 17/2765 |
| CN | 113486943 | B | * | 9/2024 | G06F 18/24 |
| CN | 113889262 | B | * | 10/2024 | G16H 50/20 |
| GB | 2516493 | A | * | 1/2015 | G06F 16/28 |
| KR | 101828503 | B1 | * | 3/2018 | |
| KR | 20180061552 | A | * | 6/2018 | |

OTHER PUBLICATIONS

Li et al., A Novel Dynamic Weight Neural Network Ensemble Model, Published In: International Journal of Distributed Sensor Networks, Publication Date: Aug. 2015, https://www.researchgate.net/publication/282475983, 14 pages.

Ibomoiye Domor Mienye et al., An improved ensemble learning approach for the prediction of heart disease risk, Published In: Informatics in Medicine Unlocked, Publication Date: Jul. 23, 2020, https://www.sciencedirect.com/science/article/pii/S2352914820304184, 5 pages.

Liying Yang, Classifiers selection for ensemble learning based on accuracy and diversity, Published In: Procedia Engineering, Publication Date: Dec. 2011, https://www.researchgate.net/publication/271617072, 5 pages.

Jason Browniee, How to Combine Predictions for Ensemble Learning, Published In: Machine Learning Mastery, Publication Date: Apr. 27, 2021, https://machinelearningmastery.com/combine-predictions-for-ensemble-learning/, 11 pages.

Butler IV, et al., The effectiveness of using diversity to select multiple classifier systems with varying classification thresholds, Published In: Journal of Algorithms & Computational Technology, Publication Date: May 14, 2018, https://journals.sagepub.com/doi/full/10.1177/1748301818761132, 13 Pages.

Ahmad et al., One-Class Classification by Ensembles of Regression models—a detailed study, Cornell University, submitted Dec. 26, 19, last revised Mar. 7, 2020, 2020, https://arxiv.org/abs/1912.11475, 6 pages.

Krawczyk B., (2013) Diversity in Ensembles for One-Class Classification. In: Pechenizkiy M., Wojciechowski M. (eds) New Trends in Databases and Information Systems. Advances in Intelligent Systems and Computing, vol. 185. Springer, Berlin, Heidelberg. https://doi.org/10.1007/978-3-642-32518-2_12, 6 pages.

Mell, Peter et al.; "The NIST Definition of Cloud Computing;" National Institute of Standards and Technology; Special Publication 800-145; Sep. 2011; 7 pages.

* cited by examiner

CLASS PREDICTION BASED ON CLASS ACCURACY OF MULTIPLE MODELS

BACKGROUND

Embodiments of the present invention relate in general to class prediction and in particular to class prediction based on class accuracy of multiple models.

SUMMARY

Embodiments of the present invention provide a method, a computer program product and a computer system, for predicting a class of a given input to multiple models.

Class parameters of each model m of M models are received after each model m has been trained and tested using multiple sample inputs, wherein the class parameters of model m for predicting class i of I classes are: class accuracy ($A_{im}$), class precision ($P_{im}$), and class recall ($R_{im}$).

A process that predicts the class of the given input is performed, using the class parameters of the M models. The process is a model ensemble process, a first threshold process, or a second threshold process.

The model ensemble process includes predicting that the class of the given input is a class that maximizes a function of class accuracy parameters $V_{im}$ selected from the group consisting of $A_{im}$, $A_{im}*P_{im}$, $A_{im}*R_{im}$, and $A_{im}*P_{im}*R_{im}$ (i=1, . . . , I and m=1, . . . , M).

The first threshold process includes satisfying, or not satisfying, a first requirement that the predicted class of the given input be predicted by running a model whose class accuracy parameter is equal to or greater than a specified class accuracy parameter threshold ($T_v$), and if the first requirement is not satisfied then the model ensemble process to predict the class of the given input is performed.

The second threshold process includes predicting that the given input is, or is not, a specified class by satisfying, or not satisfying, a second requirement that the specified class be predicted by a running of all models whose class accuracy parameter is equal to or greater than the class accuracy parameter threshold $T_v$, and if the second requirement is not satisfied then the model ensemble process to predict the class of the given input is performed.

DETAILED DESCRIPTION

Figure 1:
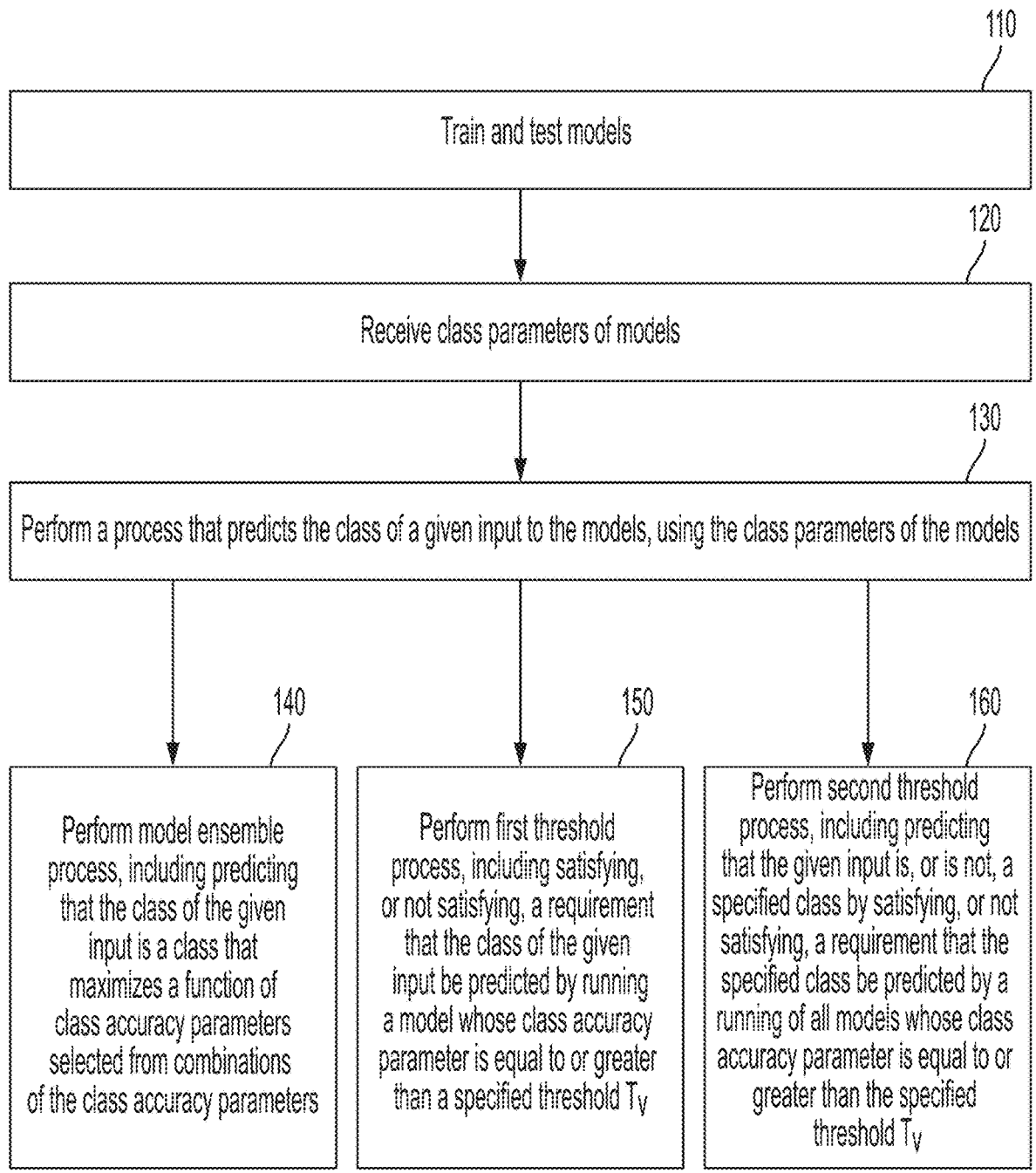
FIG. 1 is a flow chart for predicting a class of a given input to multiple models, in accordance with embodiments of the present invention.

Embodiments of the present invention involve predicting, via machine learning, a class of a given input. For example, the given input may be a fruit and the predicted class of the given input might be an orange, a lemon, a grapefruit, etc.

Although an individual machine learning model may be used to predict the class of the given input, embodiments of the present invention use a combination of such models, called an ensemble group of models, to predict the class of the given input. An ensemble group of models of the present invention is configured to predict the class of the given input more accurately than does each individual model in the ensemble group.

It should be noted that the embodiments of the present invention do not use model accuracy which is defined as a number of classifications a model correctly predicts divided by the total number of predicted classifications made.

Embodiments of the present invention instead focus on the ability of each model in the ensemble group to predict each class based on class accuracy using class accuracy parameters defined infra, which are both novel and non-obvious relative to known classification techniques.

The distinction between model accuracy and class predictions is illustrated an example in Table 1 and Table 2.

TABLE 1

Class prediction of each model based on model accuracy

| Model ID | Model Name | Model Accuracy | Predicted Class |
|---|---|---|---|
| A | KNN | 0.4 | Orange |
| B | Decision Tree | 0.7 | Lemon |
| C | LR | 0.6 | Lemon |
| D | SVM | 0.3 | Orange |
| E | Naïve Bayes | 0.7 | Lemon |

TABLE 2

Class accuracy for orange

| Model ID | Model Name | Class Accuracy For Orange |
|---|---|---|
| A | KNN | 0.9 |
| B | Decision Tree | 0.4 |
| C | LR | 0..45 |
| D | SVM | 0.95 |
| E | Naïve Bayes | 0.6 |

In this example there are five models (identified as A, B, C, D, E) and two classes (orange and lemon).

The five models are K-Nearest Neighbors (KNN), Decision Tree, Logistic Regression (LR), Support Vector Machine (SVM), and Naïve Bayes.

In Table 1, the predicted class results from deploying each model for a given input of a fruit and the model accuracy contributes to the overall accuracy of the predicted class for each model.

In Table 1, models A and D have the model accuracy of 0.4 and 0.3, respectively. However, the class prediction of "Orange" for models A and D is neglected, because the predictions from the other models B, C and E is "Lemon", which happened to be a majority. Although the model accuracy for models A and D is 0.4 and 0.3, respectively, which is low, the class accuracy of models A and D to identify Orange (TRUE POSITIVE) of 0.9 and 0.95, respectively, is high, as shown in Table 2. Thus, even if the model accuracy is low, a specific class accuracy could be large enough to predict the output more accurately or correctly, which is utilized in embodiments of the present invention.

In case of neural networks, consider image analysis by convolutional neural network (CNN) models which detect objects present in an image. Even though some models would have overall low accuracy, the models may have been tuned to predict circular edges and related objects very well and another CNN model with very high accuracy might not predict tiny objects with many crossed edges.

Table 3 is a confusion matrix defining components (TP, FP, FN, TN) for classifying inputs to a model.

TABLE 3

Confusion Matrix

| | Actually Positive (1) | Actually Negative (0) |
|---|---|---|
| Predicted Positive (1) | True Positives (TPs) | False Positives (FPs) |
| Predicted Negative (0) | False Negatives (FNs) | True Negatives (TNs) |

The confusion matrix components (TP, FP, FN, TN) are determined for a model from the results of a testing phase of the model after the model has been trained.

Embodiments of the present invention use the confusion matrix components (TP, FP, FN, TN) to define variables of class accuracy, class precision, and class recall for each class that may be predicted by a model.

A model input of a homogenous mixture of images or data files with multiple features associated with the data, is provided to train different models and learn the accuracy of the models by testing the trained models with the samples in order to determine the class accuracies of each and every class in different models involved along with the overall model accuracies of each model.

For example, a trained model may be tested with 100 input samples, where each input sample is labeled as "red", "yellow" or "blue". A truth table for the class of "red" is as follows. 50 input samples labelled as "red" are predicted by the trained model to be "red" (TP). 15 input samples labelled as "red" are predicted by the trained model to be "yellow" or "blue" (i.e., not "red") (FN). 5 input samples labelled as "yellow" or "blue" (i.e., not "red") are predicted by the trained model to be "red" (FP). 30 input samples labelled as "yellow" or "blue" (i.e., not "red") are predicted by the trained model to be yellow" or "blue" (i.e., not "red") (TN).

Class parameters are used in embodiments of the present invention. The class parameters of model m for predicting, after each model m has been trained and tested, that a given input to model m is a class i include: class accuracy ($A_{im}$), class precision ($P_{im}$), and class recall ($R_{im}$) which are defined as follows.

$$A_{im}=((TP+TN)/(TP+TN+FP+FN))_{im} \quad (1)$$

$$P_{im}=(TP/(TP+FP))_{im} \quad (2)$$

$$R_{im}=(TP/(TP+FN))_{im} \quad (3)$$

Each model m has been trained and tested and M is a total number of models subject to M≥2, so that m=1, . . . , M in Equations (1)-(3).

I is a total number of classes subject to I≥2, so that i=1, . . . , I in Equations (1)-(3).

Since TP, TN, FP and FN are determined from the testing phase of each trained model m, $A_{im}$, $P_{im}$, and $R_{im}$ are likewise determined from the testing phase of each trained model m via Equations (1), (2), and (3), respectively.

Embodiments of the present invention utilize class accuracy parameters ($V_{im}$) of model m for predicting class i, wherein $V_{im}$ is selected from the group consisting of $A_{im}$, $A_{im}*P_{im}$, $A_{im}*R_{im}$, and $A_{im}*P_{im}*R_{im}$.

Embodiments of the present invention use the M models to predict the class of a given input via the following method described in FIGS. 1-4.

The method runs each model m (m=1, . . . , M) with given input to compute a probability $Q_{im}$ that the given input is class i (i=1, . . . , I).

A class prediction function $F_i$ for class i (i=1, . . . , I) is computed via Equation (4).

$$F_i=\Sigma_{m=1}^{M} V_{im} Q_{im} \quad (4)$$

Class c is computed via Equation (5).

$$c=\arg\max\ \{i \in (1,\ \ldots\ ,\ I)\} F_i \quad (5)$$

The given input is predicted to be class c.

Equation (4) expresses $F_i$ as a function of the class accuracy parameters $V_{im}$, as a function of $V_{im}$ expressed as a linear combination of $V_{im}$ wherein the coefficients of $V_{im}$ in the linear combination are the probabilities $Q_{im}$.

FIG. 1 is a flow chart describing a method for predicting a class of a given input to multiple models, in accordance with embodiments of the present invention. The flow chart of FIG. 1 includes steps 110-160.

Figure 5:
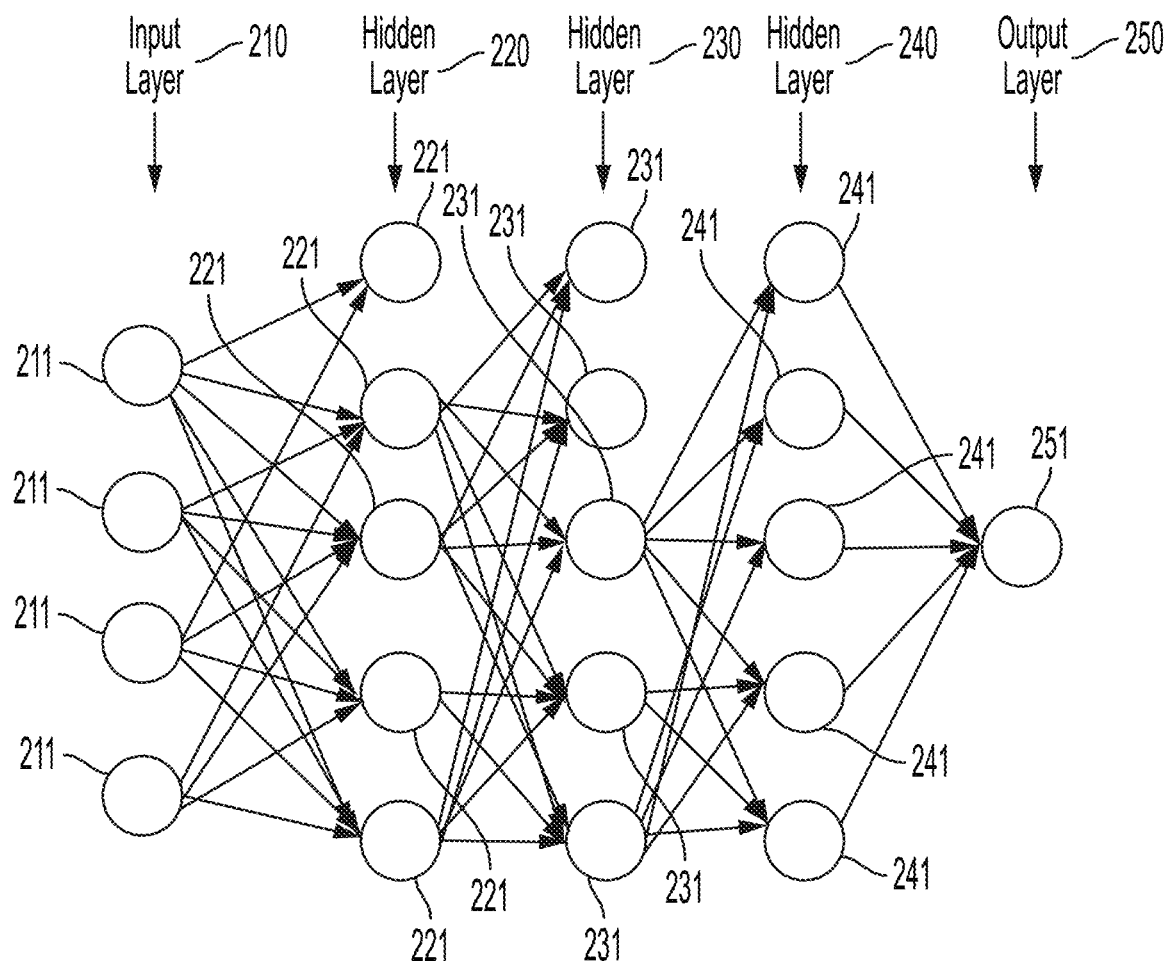
FIG. 5 depicts an exemplary model of an artificial neural network (ANN), in accordance with embodiments of the present invention.

Step 110 trains and tests M models, wherein M≥2. To illustrate training and testing a model, FIG. 5 depicts an exemplary model of an artificial neural network (ANN).

Step 120 receives class parameters of each model m of the M models. The class parameters of model m used for predicting class i of I classes are: class accuracy ($A_{im}$) defined in Equation (1), class precision ($P_{im}$) defined in Equation (2), and class recall ($R_{im}$) defined in Equation (3). The class parameters may be received from, inter alia, a data storage device, memory, another device or computer, etc.

Step 130 performs a process that predicts the class of a given input to the models, using the class parameters received in step 120. The process is performed in step 140, step 150, or step 160.

Step 140 performs a model ensemble process, including predicting that the class of the given input is a class that maximizes a function of the class accuracy parameters $V_{im}$ selected from the group consisting of $A_{im}$, $A_{im}*P_{im}$, $A_{im}*R_{im}$, and $A_{im}*P_{im}*I_{im}$ (i=1, . . . , I and m=1, . . . , M).

Step 150 performs a first threshold process, including satisfying, or not satisfying, a requirement that the predicted class of the given input is predicted by running a model whose class accuracy parameter is equal to or greater than a specified threshold $T_v$.

Step 160 performs a second threshold process, including predicting that the given input is, or is not, a specified class by satisfying, or not satisfying, a requirement that the specified class be predicted by a running of all models whose class accuracy parameter is equal to or greater than the specified threshold $T_v$.

Figure 2:
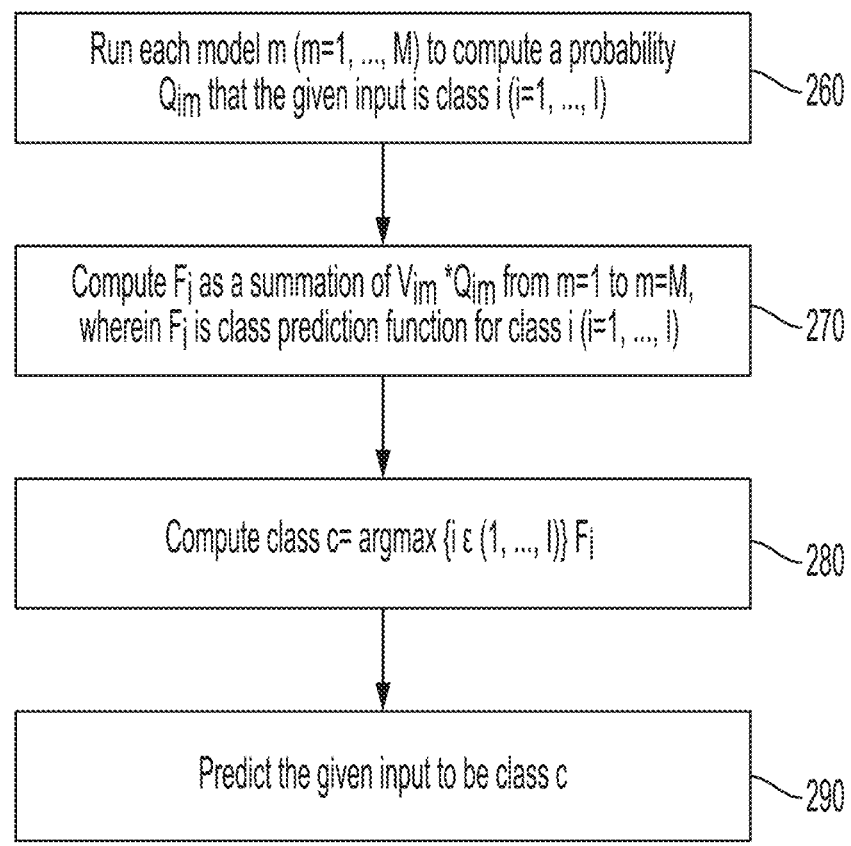
FIG. 2 is a flow chart describing a model ensemble process of a step in FIG. 1, in accordance with embodiments of the present invention.

FIG. 2 is a flow chart describing the model ensemble process of step 140 of FIG. 1, in accordance with embodiments of the present invention. The flow chart of FIG. 2 includes steps 260-290.

Step 260 runs each model m (m=1, . . . , M) to compute a probability $Q_{im}$ that the given input is class i (i=1, . . . , I).

Step 270 computes $F_i$ as a summation of $V_{im}*Q_{im}$ from m=1 to m=M, wherein $F_i$ is a class prediction function for class i (i=1, . . . , I) (see Equation (4)).

Step 280 computes class c=argmax {i∈(1, . . . , I)} $F_i$. Thus, c is the class corresponding to the maximum $F_i$ of $F_1, \ldots, F_I$.

Step 290 predicts the given input to be class c.

Figure 3:
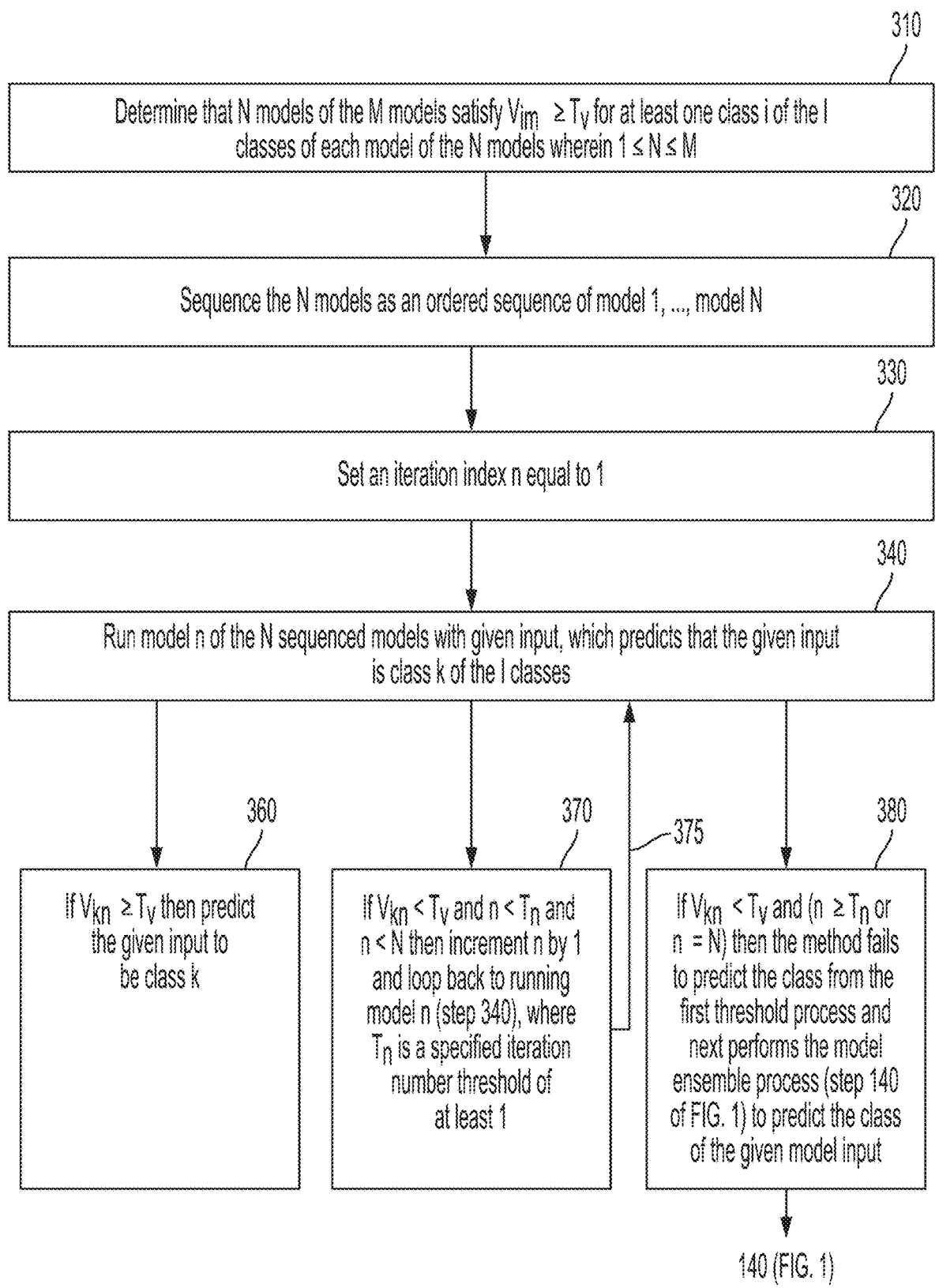
FIG. 3 is a flow chart describing a first threshold process of a step in FIG. 1, in accordance with embodiments of the present invention.

FIG. 3 is a flow chart describing the first threshold process of step 150 of FIG. 1, in accordance with embodiments of the present invention. The flow chart of FIG. 3 includes steps 310-380.

Step 310 determines that N models of the M models satisfy $V_{im} \geq T_v$ for at least one class of the I classes for each model of the N models, wherein 1≤N≤M.

Step 320 sequences the N models as an ordered sequence of model 1, . . . , model N.

In a first embodiment of step 320, the N models are sequenced in a descending order of maximum value of $V_{im}$ over the I classes (Max($V_{im}$)) such that Max($V_{i1}$)>Max($V_{i2}$)> . . . >Max($V_{iN}$), wherein Max($V_{im}$) is defined as the maximum of ($V_{1m}, V_{2m}, \ldots, V_{Im}$).

In a second embodiment of step 320, the N models are sequenced in a descending order of average value of $V_{im}$ over the I classes (Ave($V_{im}$)) such that Ave($V_{i1}$)> Ave($V_{i2}$)> . . . >Ave($V_{iN}$), wherein Ave($V_{im}$) is defined as the arithmetic average of ($V_{1m}, V_{2m}, \ldots, V_{Im}$)

In a third embodiment of step 320, the N models are sequenced randomly.

Table 4 provides an example illustrating the first and second embodiments for step 320.

TABLE 4

Class accuracy ($A_{im}$) for two classes

| Model ID | Model Name | Class Accuracy For Class α | Class Accuracy For Class β |
| --- | --- | --- | --- |
| A | KNN | 94% | 50% |
| B | Decision Tree | 70% | 92% |
| C | LR | 80% | 90% |
| D | SVM | 91% | 89% |
| E | Naïve Bayes | 45% | 93% |

In this example of two classes α and β (I=2), the specified threshold $T_v$=92% and only the three models of A, B and E satisfy $V_{im} \geq T_v$ for at least one class of the 2 classes. Thus, N=3 and the N models are model A, model B, and model E.

For the first embodiment of step 320, Max($V_{im}$) is 94% for model A, 92% for model B, and 93% for model E. Thus, the N models are sequenced as model A, model E, and model B corresponding to 94%, 93%, and 92%, respectively, for Max($V_{im}$).

For the second embodiment of step 320, Ave($V_{im}$) is 72% (i.e. (94%+50%)/2) for model A, 81% (i.e. (70%+92%)/2) for model B, and 69% (i.e. (45%+93%)/2) for model E. Thus, the N models are sequenced as model B, model A, and model E corresponding to 81%, 72%, and 69%, respectively for Ave($V_{im}$).

Step 330 sets an iteration index n equal to 1.

Step 340 runs model n of the N sequenced models with given input, which predicts that the given input is class k of the I classes. Then step 360, step 370 or step 380 is next executed.

If $V_{kn} \geq T_v$ then step 360 predicts the given input to be class k.

If $V_{kn} < T_v$ and n<$T_n$ and n<N then step 370 increments n by 1 and loops back 375 to running model n (step 340), where $T_n$ is a specified iteration number threshold of at least 1

If $V_{kn} < T_v$ and (n≥$T_n$ or n=N) then the method fails to predict the class from the first threshold process and next performs the model ensemble process by branching to step 140 of FIG. 1 to predict the class of the given input.

Figure 4:
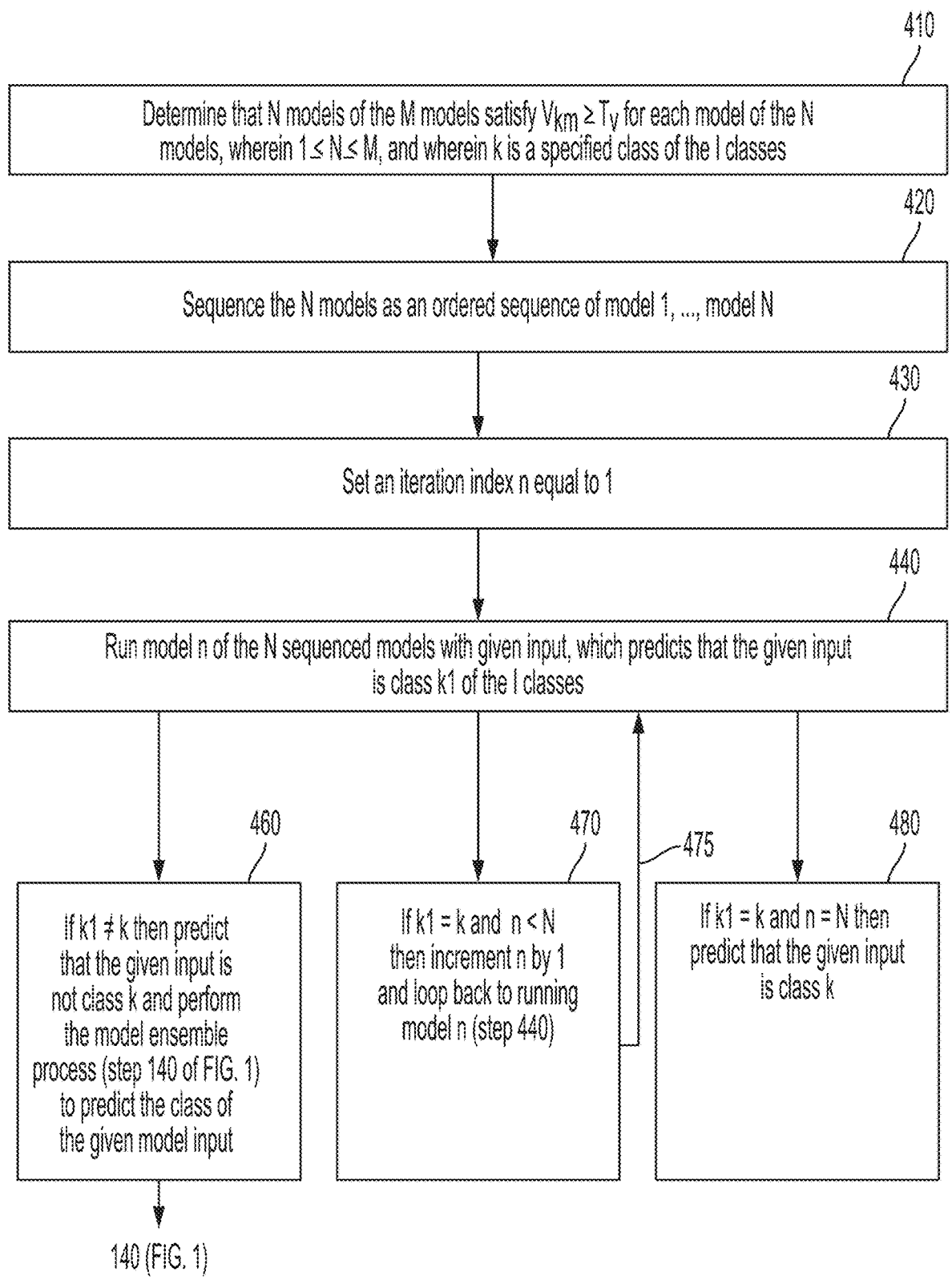
FIG. 4 is a flow chart describing a second threshold process of a step in FIG. 1, in accordance with embodiments of the present invention.

FIG. 4 is a flow chart describing the second threshold process of step 160 of FIG. 1, in accordance with embodiments of the present invention. The flow chart of FIG. 2 includes steps 410-480.

Step 410 determines that N models of the M models satisfy $V_{km} \geq T_v$ for each model of the N models, wherein 1≤N≤M, and wherein k is a specified class of the I classes Step 420 sequences the N models as an ordered sequence of model 1, . . . , model N.

In a first embodiment of step 410, the N models are sequenced in an ascending order of $V_{km}$ such that $V_{k1} < V_{k2} < \ldots < V_{kN}$.

In a second embodiment of step 410, the N models are sequenced in a descending order of $V_{km}$ such that $V_{k1} > V_{k2} > \ldots > V_{kN}$.

In a third embodiment of step 410, the N models are sequenced randomly.

Step 430 sets an iteration index n equal to 1.

Step 440 runs model n of the N sequenced models with the given input, which predicts that the given input is class k1 of the I classes. Then step 460, step 470 or step 480 is next executed.

If k1≠k, then step 460 predicts that the given input is not class k and performs the model ensemble process (step 140 of FIG. 1) to predict the class of the given input If k1=k and n<N, then step 470 increments n by 1 and loops back 475 to running model n (step 440), If k1=k and n=N, then step 480 predicts that the given input is class k.

To illustrate training and testing a model, FIG. 5 depicts an exemplary model of an artificial neural network (ANN), in accordance with embodiments of the present invention).

The layers in the ANN include an input layer 210 comprising nodes 211, hidden layers 220, 230 and 240 comprising nodes 221, 231 and 241, respectively, and an output layer 230 comprising output node 231. The nodes 211, 221, 231, 241 and 251 are also called neurons.

Generally, the ANN can have one or more nodes in the input layer, one or more hidden layers, one or more nodes in each hidden layer, and one or more nodes in the output layer.

There is a weight to be determined between each pair of connected nodes in the ANN. For example, in FIG. 5, there are 17 weights between the input layer 210 and the first hidden layer 220 (i.e., 5, 5, 3 and 4 connections between the 4 nodes 211 of the input layer 210 and the 5 nodes 221 of the first hidden layer 220). Similarly, there are weights to be determined between each pair of connected nodes in the hidden layers 220, 230 and 240, and a weight to be determined between each pair of connected nodes in the last hidden layer 240 and the nodes of the output layer 250, In addition, each node of the one or more hidden layers 220, 230 and 240 has a bias. For a given node 221 of the first hidden layer 220, a summation over weighted values of the input nodes 211 that are connected to the given node 221 of the first hidden layer 221 is computed, using the weights between the given node 221 of the first hidden layer 220 and the values of the input nodes 211 that are connected to the given node 221 of the first hidden layer. The computed summation is incremented by the bias of the given node 211 of the first hidden layer 210. The incremented summation is fed into an activation function (e.g., sigmoid function, hyperbolic tangent function, rectified linear function, etc.) and the output from the activation function becomes the value of the given node 221 of the first hidden layer 220. The preceding process is repeated for all other nodes 221 of the first hidden layer 220.

The preceding process is sequentially repeated between the successive layers in each pair of successive layers of the hidden layers 220, 230, and 240 until all nodes in the hidden layers 820 contain values of weights.

The preceding process is repeated between the last hidden layer 240 and the output layer 250 until all nodes in the output layer 250 contain values. In FIG. 5, the output layer 250 contains one output node 251.

The model development has a training phase followed by a testing phase. During the training phase the model is continuously improved until a specified accuracy of the model has been achieved, after which the model is tested in the testing phase in an attempt to confirm that the trained model has achieved the specified accuracy.

Training data, namely a portion of the model input data, is used to train the ANN in the training phase. Training the ANN with the training data is a process in which the weights are selected randomly initially and the biases are set to zero initially. The weights and biases are changed in successive training iterations in a manner that successively reduces a loss function with respect to variations between the predicted output and the actual output.

The training phase includes an iterative process. In each iteration of the iterative process, the model is trained using the model input data as training data, followed by validating the trained model using validation input data. The model's accuracy is increased in each successive iteration and the iterative process uses the hardware resources, a data model training language, and software resources.

The training iterative process ends at a final iteration of the iterative process if during the final iteration the validating determines that a specified target accuracy of the model has been achieved.

Model deployment provides input data into the developed (i.e., trained and tested) model to produce one or more outputs.

Figure 6:
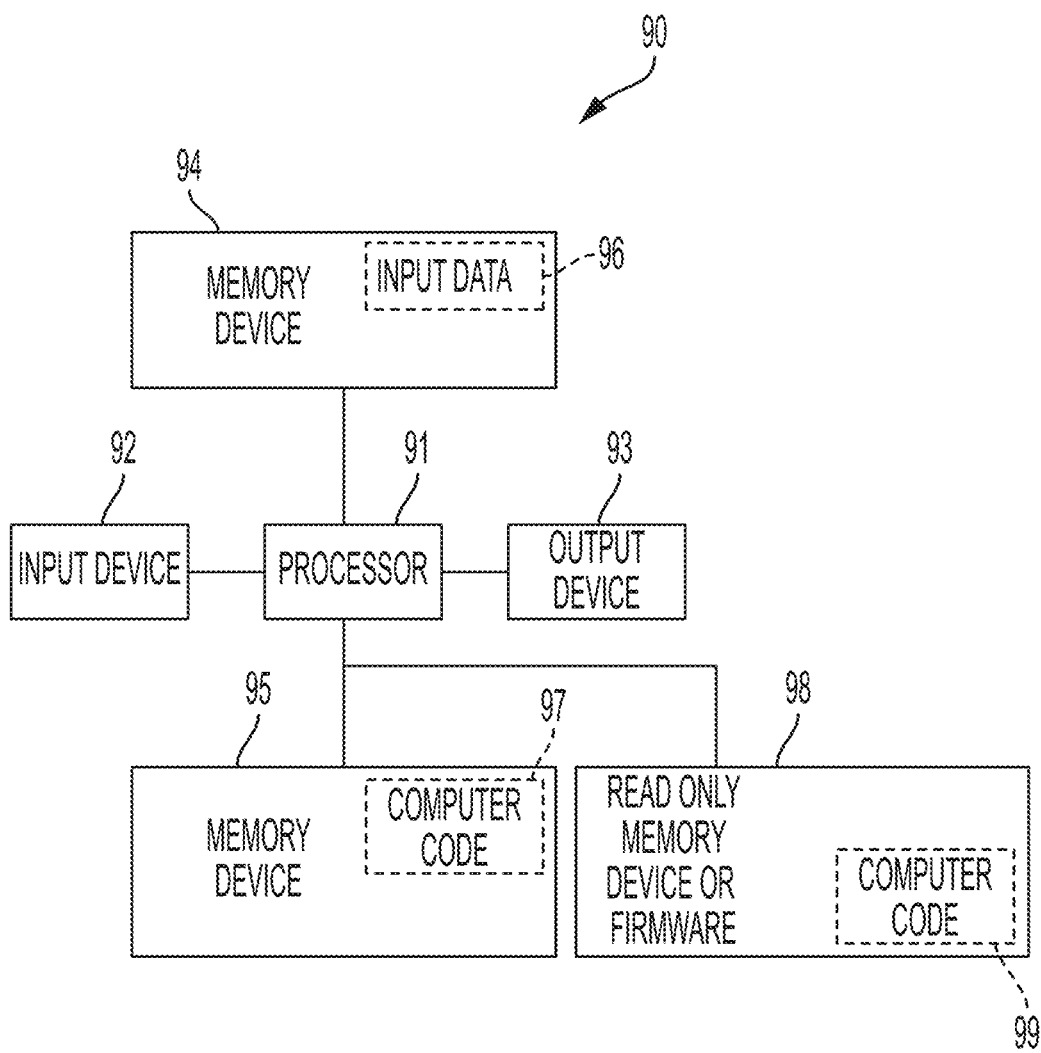
FIG. 6 illustrates a computer system, in accordance with embodiments of the present invention.

FIG. 6 illustrates a computer system 90, in accordance with embodiments of the present invention.

The computer system 90 includes a processor 91, an input device 92 coupled to the processor 91, an output device 93 coupled to the processor 91, and memory devices 94 and 95 each coupled to the processor 91. The processor 91 represents one or more processors and may denote a single processor or a plurality of processors. The input device 92 may be, inter alia, a keyboard, a mouse, a camera, a touchscreen, etc., or a combination thereof. The output device 93 may be, inter alia, a printer, a plotter, a computer screen, a magnetic tape, a removable hard disk, a floppy disk, etc., or a combination thereof. The memory devices 94 and 95 may each be, inter alia, a hard disk, a floppy disk, a magnetic tape, an optical storage such as a compact disc (CD) or a digital video disc (DVD), a dynamic random access memory (DRAM), a read-only memory (ROM), etc., or a combination thereof. The memory device 95 includes a computer code 97. The computer code 97 includes algorithms for executing embodiments of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 98 (e.g., including algorithms) may be stored on a static, nonremovable, read-only storage medium such as a Read-Only Memory (ROM) device 99, or may be accessed by processor 91 directly from such a static, nonremovable, read-only medium 99. Similarly, in some embodiments, stored computer program code 97 may be stored as computer-readable firmware 99, or may be accessed by processor 91 directly from such firmware 99, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with cross-referencing metrics associated with plug-in components, generating software code modules, and enabling operational functionality of target cloud components. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with cross-referencing metrics associated with plug-in components, generating software code modules, and enabling operational functionality of target cloud components. In another embodiment, the invention provides a business method that performs the process steps of the invention on a subscription, advertising, and/or fee basis. That is, a service supplier, such as a Solution Integrator, could offer to enable a process for improving software technology associated with cross-referencing metrics associated with plug-in components, generating software code modules, and enabling operational functionality of target cloud components. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
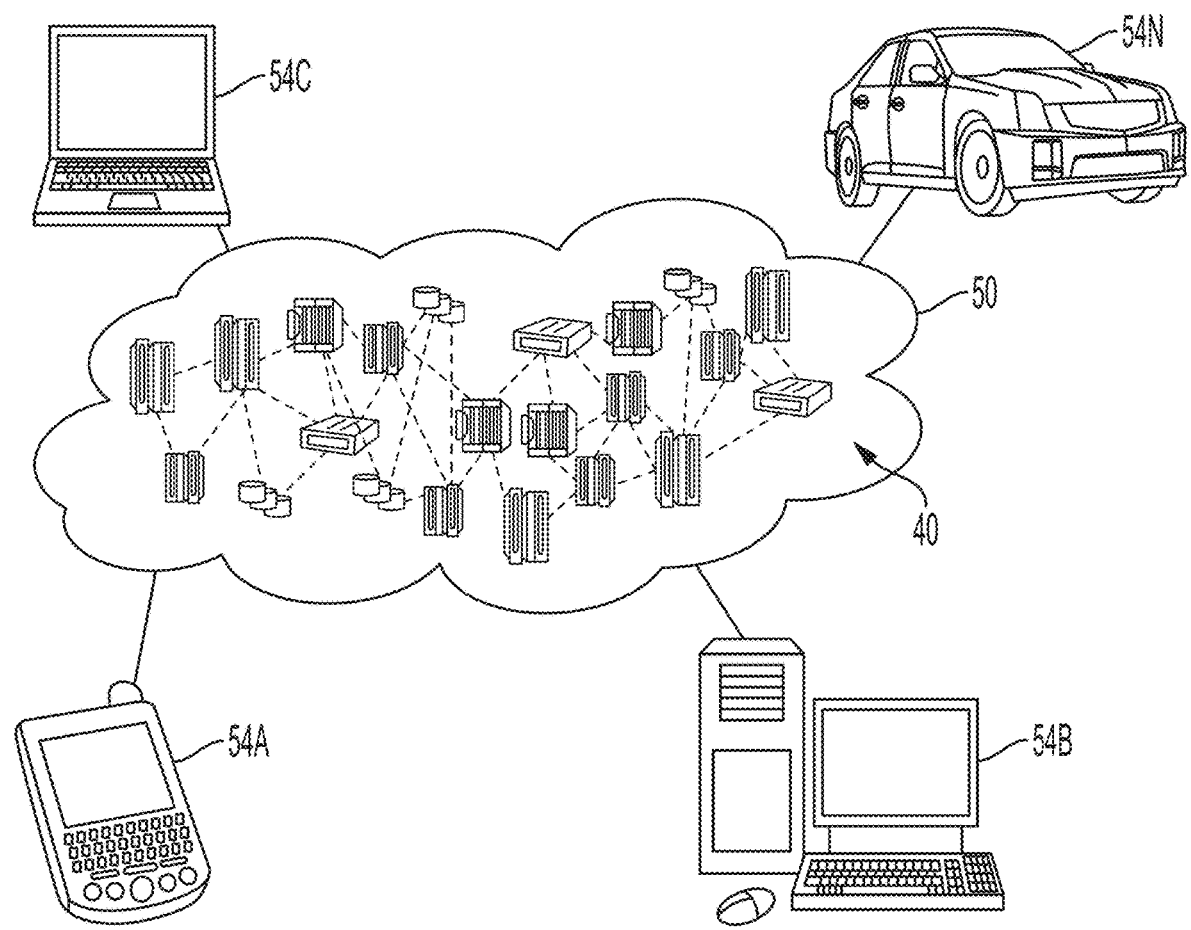
FIG. 7 depicts a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
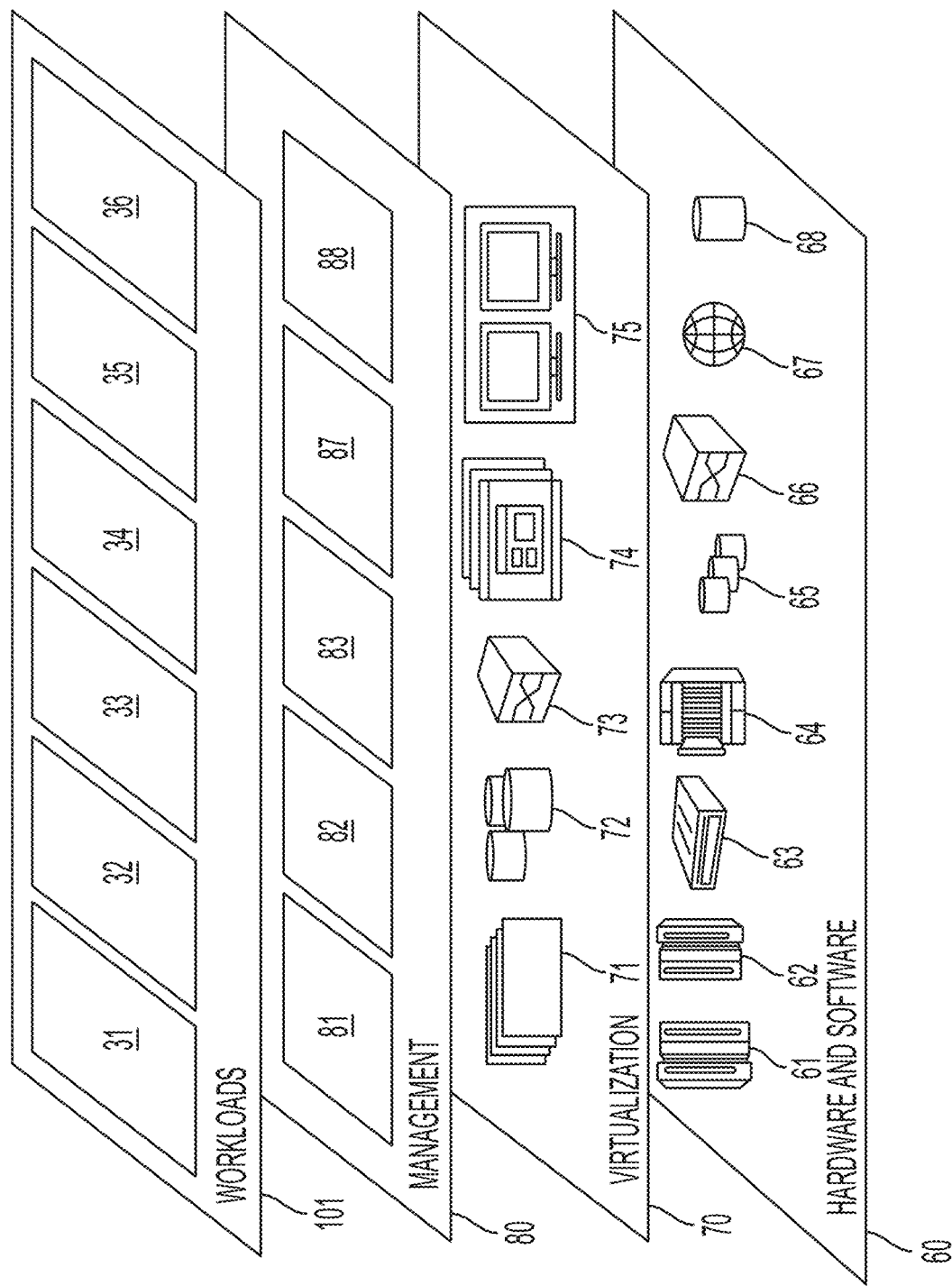
FIG. 8 depicts abstraction model layers, in accordance with embodiments of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 30 provides examples of functionality for which the cloud computing environment may be utilized. Examples of workloads and functions which may be provided from this layer include: mapping and navigation 31; software development and lifecycle management 32; virtual classroom education delivery 33; data analytics processing 34; transaction processing 35; and prediction of a class of a given input to multiple models 36.

Examples and embodiments of the present invention described herein have been presented for illustrative purposes and should not be construed to be exhaustive. While embodiments of the present invention have been described herein for purposes of illustration, many modifications and changes will become apparent to those skilled in the art. The description of the present invention herein explains the principles underlying these examples and embodiments, in order to illustrate practical applications and technical improvements of the present invention over known technologies, computer systems, and/or products.

What is claimed is:

1. A method for predicting a class of a given input to multiple models, said method comprising:

receiving, by one or more processors of a computer system, class parameters of each model m of M models after each model m of the M models has been trained and tested using multiple sample inputs, wherein the class parameters of model m for predicting class i of I classes are: class accuracy ($A_{im}$), class precision ($P_{im}$), and class recall ($R_{im}$), wherein M>2 wherein I>2, wherein $A_{im}=((TP+TN)/(TP+TN+FP+FN))_{im}$, $P_{im}=(TP/(TP+FP))_{im}$, and $R_{im}=(TP/(TP+FN))_{im}$, and wherein as determined from classification testing for class i and model m: TP is a number of true positives, TN is a number of true negatives, FP is a number of false positives, and FN is a number of false negatives;

performing, by the one or more processors, a process that predicts the class of the given input, using the class parameters of the M models;

ascertaining, by the one or more processors, whether the process is a first threshold process or a second threshold process;

if said ascertaining ascertains that the process is the first threshold process then performing, by the one or more processors, the first threshold process, comprising:

determining that N models of the M models satisfy $V_{im}>T_v$ for at least one class i of the I classes for each model of the N models, wherein 1<N<M, wherein Tv is a specified class accuracy parameter threshold, and wherein $V_{im}$ denotes class accuracy parameters selected from the group consisting of $A_{im}$, $A_{im}*P_{im}$, $A_{im}*R_{im}$ and $A_{im}*P_{im}*R_{im}$ (I=1, . . . , I and m=1, . . . , M);

sequencing the N models as an ordered sequence of model 1 . . . model N;

setting an iteration index n equal to 1;

running model n of the N sequenced models which predicts that the given input is class k of the I classes;

if $V_{kn}>T_v$ then predicting the given input to be class k;

if $V_{kn}<T_v$ and n<$T_n$ and n<N then incrementing n by 1 and looping back to said running model n, wherein Ta is a specified iteration number threshold of at least 1:

if $V_{kn}<T_v$ and (n>T, or n=N) then failing to predict the class from the first threshold process and performing a model ensemble process to predict the class of the given input;

if said ascertaining ascertains that the process is the second threshold process then performing, by the one or more processors, the second threshold process, comprising: determining whether the given input is the specified class denoted as class k, which comprises:

determining that N models of the M models satisfy $V_{km}>T_v$ for each model of the N models, wherein 1<N<M;

sequencing the N models as an ordered sequence of model 1, . . . , model N;

setting an iteration index n equal to 1;

running model n of the N sequenced models which predicts that the given input is class k1 of the I classes;

if k1≠k then predicting that the given input is not class k and performing d model ensemble process to predict the class of the given input;

if k1=k and n<N then incrementing n by 1 and looping back to said running model n;

if k1=k and n=N then predicting that the given input is class k, wherein said performing the model ensemble process comprises predicting, by the one or more processors, that the class of the given input is a class that maximizes a function of the class accuracy parameters $V_{im}$ by executing a procedure comprising:

running each model m (m=1, . . . , M) to compute a probability $Q_{im}$ that the given input is class i (i=1, . . . , I);

computing $F_i$ as a summation of $V_{im}*Q_{im}$ from m=1 to m=M, wherein $F_i$ is a class prediction function for class i (i=1, . . . , I);

computing the class c=arg max $\{i\in(1, \ldots, I)\}F_i$; and predicting the given input to be class c.

2. The method of claim 1, wherein said ascertaining ascertains that the process is the first threshold process.

3. The method of claim 1, wherein said sequencing the N models comprises sequencing the N models in a descending order of maximum value of $V_{im}$ over the I classes (Max $(V_{im})$) such that $Max(V_{i1})>Max(V_{i2})> \ldots >Max(V_{iN})$.

4. The method of claim 1, wherein said ascertaining ascertains that the process is the second threshold process.

5. The method of claim 1, wherein $V_{im}$ consists of $A_{im}*P_{im}*R_{im}$.

6. The method of claim 1, wherein $V_{im}$ consists of $A_{im}$.

7. A computer program product, comprising one or more computer readable hardware storage devices having computer readable program code stored therein, said program code containing instructions executable by one or more processors of a computer system to implement a method for predicting a class of a given input to multiple models, said method comprising:

receiving, by the one or more processors, class parameters of each model m of M models after each model m has been trained and tested using multiple sample inputs, wherein the class parameters of model m for predicting class i of I classes are: class accuracy ($A_{im}$), class precision ($P_{im}$), and class recall ($R_{im}$)), wherein M≥2, wherein I≥2, wherein $A_{im}$=((TP+TN)/(TP+TN+FP+FN))$_{im}$, $P_{im}$=(TP/(TP+FP))$_{im}$, and $R_{im}$=(TP/(TP+FN))$_{im}$ and wherein as determined from classification testing for class i and model m: TP is a number of true positives, TN is a number of true negatives, FP is a number of false positives, and FN is a number of false negatives;

performing, by the one or more processors, a process that predicts the class of the given input, using the class parameters of the M models;

ascertaining, by the one or more processors, whether the process is a first threshold process or a second threshold process;

if said ascertaining ascertains that the process is the first threshold process then performing, by the one or more processors, the first threshold process, comprising:

determining that N models of the M models satisfy $V_{im}>T_v$ for at least one class i of the I classes for each model of the N models, wherein 1≤N≤M, wherein Tv is a specified class accuracy parameter threshold, and wherein $V_{im}$ denotes class accuracy parameters selected from the group consisting of $A_{im}$, $A_{im}*P_{im}$, $A_{im}*R_{im}$, and $A_{im}*P_{im}*R_{im}$ (i=1 . . . I and m=1, . . . , M);

sequencing the N models as an ordered sequence of model 1, . . . , model N;

setting an iteration index n equal to 1;

running model a of the N sequenced models which predicts that the given input is class k of the I classes;

if $V_{kn}≥T_v$ then predicting the given input to be class k;

if $V_{kn}<T_v$ and n<$T_n$ and n<N then incrementing n by 1 and looping back to said running model n, wherein $T_n$ is a specified iteration number threshold of at least 1;

if $V_{kn}<T_v$ and (n>$T_n$ or n=N) then failing to predict the class from the first threshold process and performing a model ensemble process to predict the class of the given input;

if said ascertaining ascertains that the process is the second threshold process then performing, by the one or more processors, the second threshold process, comprising: determining whether the given input is the specified class denoted as class k, which comprises:

determining that N models of the M models satisfy $V_{km}≥T_v$ for each model of the N models, wherein 1<N<M;

sequencing the N models as an ordered sequence of model 1 . . . model N;

setting an iteration index n equal to 1;

running model n of the N sequenced models which predicts that the given input is class k1 of the I classes;

if k1≠k then predicting that the given input is not class k and performing the model ensemble process to predict the class of the given input;

if k1=k and n<N then incrementing n by 1 and looping back to said running model n;

if k1=k and n=N then predicting that the given input is class k, wherein said performing the model ensemble process comprises predicting, by the one or more processors, that the class of the given input is a class that maximizes a function of the class accuracy parameters $V_{im}$ by executing a procedure comprising:

running each model m (m=1, . . . , M) to compute a probability $Q_{im}$ that the given input is class i (i=1, . . . , I);

computing $F_i$ as a summation of $V_{im}*Q_{im}$ from m=1 to m=M, wherein $F_i$ is a class prediction function for class i (i=1, . . . , I);

computing the class c=arg max $\{i\in(1, \ldots, I\}F_i$; and predicting the given input to be class c.

8. The computer program product of claim 7, wherein said ascertaining ascertains that the process is the first threshold process.

9. The computer program product of claim 7, wherein said ascertaining ascertains that the process is the second threshold process.

10. The computer program product of claim 7, wherein said sequencing the N models comprises sequencing the N models in an ascending order of $V_{km}$ such that $V_{k1}<V_{k2}< \ldots <V_{kN}$.

11. The computer program product of claim 7, wherein $V_{im}$ consists of $A_{im}*P_{im}*R_{im}$.

12. The computer program product of claim 7, wherein $V_{im}$ consists of $A_{im}$.

13. A computer system, comprising one or more processors, one or more memories, and one or more computer readable hardware storage devices, said one or more hardware storage devices containing program code executable by the one or more processors via the one or more memories to implement a method for predicting a class of a given input to multiple models, said method comprising:

receiving, by the one or more processors, class parameters of each model m of M models after each model m has been trained and tested using multiple sample inputs, wherein the class parameters of model m for predicting class i of I classes are: class accuracy ($A_{im}$), class precision ($P_{im}$), and class recall ($R_{im}$)), wherein M≥2, wherein I≥2, wherein $A_{im}$=((TP+TN)/(TP+TN+FP+FN))$_{im}$, $P_{im}$=(TP/(TP+FP))$_{im}$, and $R_{im}$=(TP/(TP+FN))$_{im}$ and wherein as determined from classification testing for class i and model mi: TP is a number of true positives, TN is a number of true negatives, FP is a number of false positives, and FN is a number of false negatives;

performing, by the one or more processors, a process that predicts the class of the given input, using the class parameters of the M models;

ascertaining, by the one or more processors, whether the process is a first threshold process or a second threshold process;

if said ascertaining ascertains that the process is the first threshold process then performing, by the one or more processors, the first threshold process, comprising:

determining that N models of the M models satisfy $V_{im} > T_v$ for at least one class i of the I classes for each model of the N models, wherein $1 \leq N \leq M$, wherein Tv is a specified class accuracy parameter threshold, and wherein $V_{im}$ denotes class accuracy parameters selected from the group consisting of $A_{im}$, $A_{im}*P_{im}$, $A_{im}*R_{im}$, and $A_{im}*P_{im}*R_{im}$ (i=1 . . . I and m=1, . . . , M);

sequencing the N models as an ordered sequence of model 1 . . . , model N;

setting an iteration index n equal to 1;

running model n of the N sequenced models which predicts that the given input is class k of the I classes:

if $V_{kn} > T_v$ then predicting the given input to be class k:

if $V_{kn} < T_v$ and $n < T_n$ and n<N then incrementing n by 1 and looping back to said running model n, wherein Ta is a specified iteration number threshold of at least 1:

if $V_{kn} < T_v$ and (n>$T_n$ or n=N) then failing to predict the class from the first threshold process and performing a model ensemble process to predict the class of the given input;

if said ascertaining ascertains that the process is the second threshold process then performing, by the one or more processors, the second threshold process, comprising: determining whether the given input is the specified class denoted as class k, which comprises:

determining that N models of the M models satisfy $V_{km} \geq T_v$ for each model of the N models, wherein 1<N<M:

sequencing the N models as an ordered sequence of model 1 . . . model N:

setting an iteration index n equal to 1;

running model n of the N sequenced models which predicts that the given input is class k1 of the I classes;

if k1≠k then predicting that the given input is not class k and performing the model ensemble process to predict the class of the given input;

if k1=k and n<N then incrementing n by 1 and looping back to said running model n:

if k1=k and n=N then predicting that the given input is class k, wherein said performing the model ensemble process comprises predicting, by the one or more processors, that the class of the given input is a class that maximizes a function of the class accuracy parameters $V_{im}$ by executing a procedure comprising:

running each model m (m=1, . . . , M) to compute a probability $Q_{im}$ that the given input is class i (i=1, . . . , I);

computing $F_i$ as a summation of $V_{im}*Q_{im}$ from m=1 to m=M, wherein $F_i$ is a class prediction function for class i (i=1, . . . , D);

computing the class c=arg max $\{i \in (1, \ldots, D)\}$ $F_i$; and predicting the given input to be class c.

14. The computer system of claim 13, wherein said ascertaining ascertains that the process is the first threshold process.

15. The computer system of claim 13, wherein said ascertaining ascertains that the process is the second threshold process.

16. The computer system of claim 13, wherein $V_{im}$ consists of $A_{im}*P_{im}*R_{im}$.

17. The computer system of claim 13, wherein $V_{im}$ consists of $A_{im}$.

* * * * *